United States Patent [19]

Ciciora

[11] 3,855,496

[45] Dec. 17, 1974

[54] ANTI-PAIRING SYSTEM FOR A TELEVISION RECEIVER

[75] Inventor: Walter S. Ciciora, Park Ridge, Ill.

[73] Assignee: Zenith Radio Corporation, Chicago, Ill.

[22] Filed: Nov. 7, 1972

[21] Appl. No.: 304,431

[52] U.S. Cl. ...315/393, 315/410, 315/403; 307/228; 178/69.5 TV

[51] Int. Cl. ... H01j 29/70

[58] Field of Search ... 315/19, 24, 27 R, 27 TD; 178/7.7

[56] References Cited

UNITED STATES PATENTS

| | | | |
|---|---|---|---|
| 2,681,383 | 6/1954 | Loe | 178/7.7 |
| 2,717,329 | 9/1955 | Jones et al. | 315/24 |
| 2,801,278 | 7/1957 | Moore | 178/7.7 X |
| 3,499,980 | 3/1970 | Smierciak | 178/7.7 X |

*Primary Examiner*—Benjamin R. Padgett
*Assistant Examiner*—P. A. Nelson
*Attorney, Agent, or Firm*—Nicholas A. Camasto; John H. Moore; John J. Pederson

[57] ABSTRACT

This disclosure depicts methods and apparatus for improving interlace between the horizontal scan lines of alternate raster fields of a television receiver, and specifically for overcoming the problems of line pairing. The vertical ramp waveforms which drive the vertical deflection yoke are displaced in time with respect to the horizontal flyback pulses by a predetermined interval to insure that the beginnings of the vertical ramp waveforms for either field are not overlapped by a horizontal flyback pulse.

15 Claims, 17 Drawing Figures

FIG. 1A, FIG. 1B
Vertical Ramp Wave Forms
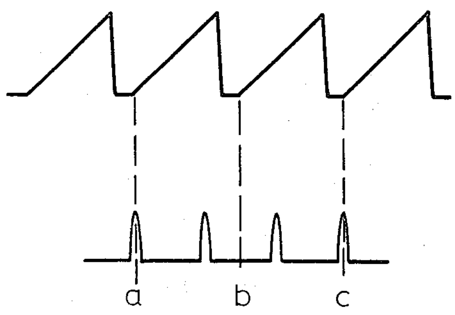
Horizontal Flyback Pulses
FIG. 2A
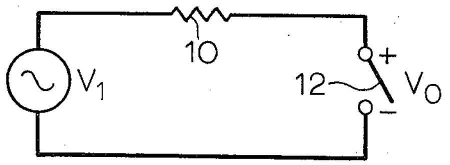
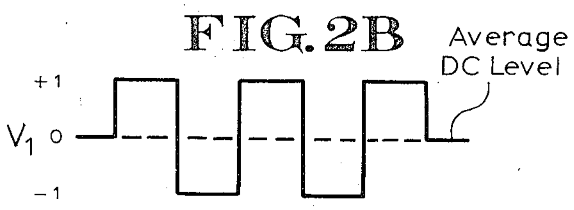
FIG. 2B
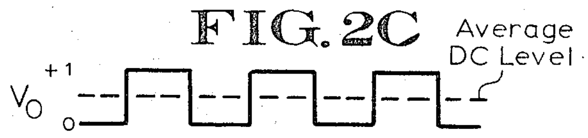
FIG. 2C
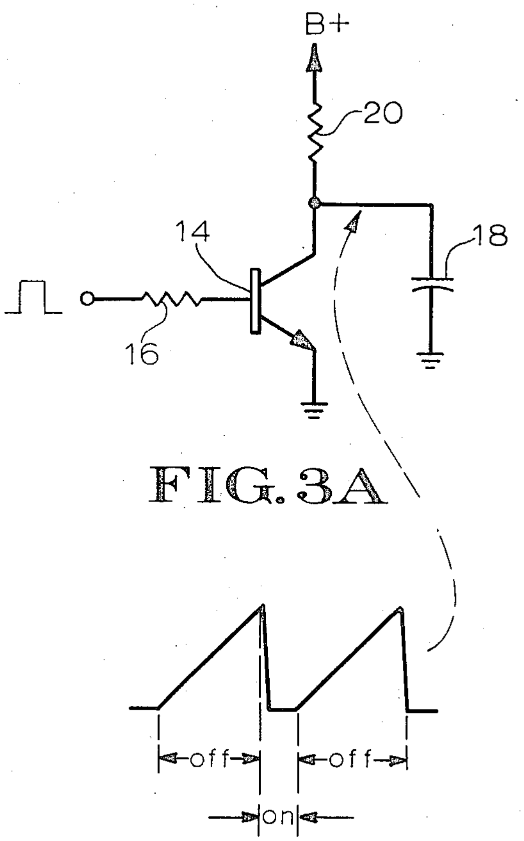
FIG. 3A
FIG. 3B
FIG. 4A, FIG. 4B
Vertical Ramp Wave Forms
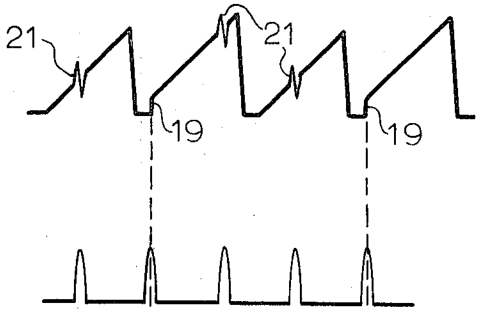
Horizontal Flyback Pulses

ANTI-PAIRING SYSTEM FOR A TELEVISION RECEIVER

BACKGROUND OF THE INVENTION

This invention relates to television receivers, and in particular is directed to the elimination of the pairing of horizontal scan lines in a television raster.

U.S. television broadcast standards specify that the transmitted television signal shall consist of 30 complete picture scenes or "frames" per second. This "frame" rate of 30 picture scenes per second is sufficient to give the illusion of continuous motion if the scenes portray animation. It is, however, insufficient to overcome the sensation of flicker associated with the presentation of 30 independent picture scenes per second. In motion pictures, it is common practice to display each picture twice in succession, thereby effectively doubling the frame rate. A related method is used in television practice wherein each picture frame is divided into two interlaced fields which are displayed at twice the frame rate; each field contains one-half the picture information in one complete scene or frame. This field rate of 60 per second is more than adequate to overcome any sensation of flicker. The relationship between the fields and their method of presentation will be discussed in more detail below.

The conventional method of scanning a television raster is as follows. The scanning of the electron beam is begun in the upper left-hand corner of the television raster and is caused to scan from left to right and down until it reaches the right edge of the raster. This initial scan will be referred to as the first line of the television picture. The beam is then made to return to the left side of the picture tube at a position two lines below the starting point of the first line. The scan then proceeds as before, from left to right on what is now referred to as the third scan line. Upon reaching the end of the third line, it is returned to the left side of the picture tube as described above where the fifth scan line is initiated. This scanning procedure continues, skipping every even numbered line, until the entire raster has been scanned once. The final scan line of this first field (herein termed field A) is actually a half line which terminates in the bottom center of the raster. The total time elapsed for the scanning of field A is approximately 1/60 of a second.

Upon completion of field A, the beam is returned to the top middle of the raster where the scan of field B begins, ½ line to the right of the point where field A began. Since the first line of field B is on the same vertical level as the first line of field A but with a horizontal separation of ½ line, and since field B is deflected vertically in the same manner as field A, the first scan line of field B will terminate one horizontal scan line above the first scan line of field A. The second scan line of field B will then begin two horizontal scan lines below the first line of field B, with the first field A scan line in between. This scanning method continues with all subsequent field B scan lines falling between the field A scan lines. When field B scan lines are positioned equidistant from the field A scan lines which are immediately above and below, the raster is said to be perfectly interlaced.

There are two essential requirements for this perfect interlace between successive scan lines of fields A and B. The first requirement is that the initial scan lines of each field must begin at the same vertical height on the raster. The second requirement is that the initial scan lines of each field must be separated horizontally by exactly ½ line. Any deviation from the above two requirements will result in imperfect interlace. For example, if the initial scan line of field B is vertically displaced from its correct position, the beam will scan too close to one of the lines in field A instead of scanning exactly between lines. This incorrect start produces an unequal vertical separation between odd and even lines that is carried throughout the entire frame. This defect in the interlaced scanning is called "line pairing". For the extreme case, lines in successive fields may be scanned in exact coincidence, with the result that the raster contains only one-half the proper number of lines.

As a result of poor interlace the viewer will notice a significant reduction in the apparent resolution of the television picture. In addition, the effect of moire in the reproduced picture becomes much more evident as a result of poor interlace. Moire is a spurious pattern in the reproduced picture resulting from interference beats between two sets of repetitive structures in the picture. Moire may be produced, for example, by interference between the raster line pattern and the pattern of phosphor dots on a three color shadow mask-type picture tube. When pairing occurs, moire effects are intensified due to the apparent greater contrast and the coarseness of the paired line structure.

Poor interlace and its associated effects on the reproduced television picture have long been recognized as problems in the television industry. It has been further recognized that a common cause of poor interlace has been a pickup of components of the horizontal flyback pulse by the vertical deflection circuitry. Knowing this, the most obvious approach to solving this problem of pickup would be to shield the vertical deflection circuitry from the effects of the horizontal flyback pulse. However, because of the large amplitude of the horizontal flyback pulse and the fact that only a very small fraction of the horizontal flyback pulse need be induced into the vertical system to produce pairing of scan lines, it is exceedingly difficult to achieve the degree of shielding required.

OBJECTS OF THE INVENTION

It is a general object of this invention to provide methods and means for improving vertical deflection of the electron beam in a television cathode ray tube.

It is a more specific object to provide methods and means for minimizing line pairing in the raster of a television receiver, and to thereby minimize any moire pattern in a reproduced television display.

It is a further object of this invention to provide methods and means for immunizing the vertical deflection system of a television receiver from the effects of horizontal flyback pulses so as to assure non-degradation of the interlace capabilities of the receiver.

BRIEF DESCRIPTION OF THE DRAWINGS

The features of this invention which are believed to be new are set forth with particularity in the appended claims. The invention, together with further objects and advantages thereof, may best be understood by reference to the following description in conjunction with the accompanying drawings in which:

FIGS. 1A–1B depict schematically trains of idealized vertical ramp waveforms and selected horizontal flyback pulses, respectively, as may be developed by a television receiver;

FIG. 2A depicts a simple series circuit which illustrates a phenomenon associated with time-varying impedances, and which is useful in understanding the present invention;

FIGS. 2B–2C depict waveforms associated with the circuitry of FIG. 2A;

FIGS. 3A–3B depict a simplified vertical ramp waveform generator and its ramp output waveform, respectively;

FIGS. 4A–4B depict schematically another train of vertical ramp waveforms and selected horizontal flyback pulses, respectively, as may be developed by a conventional television receiver;

DESCRIPTION OF THE PREFERRED EMBODIMENT

Figure 5A:
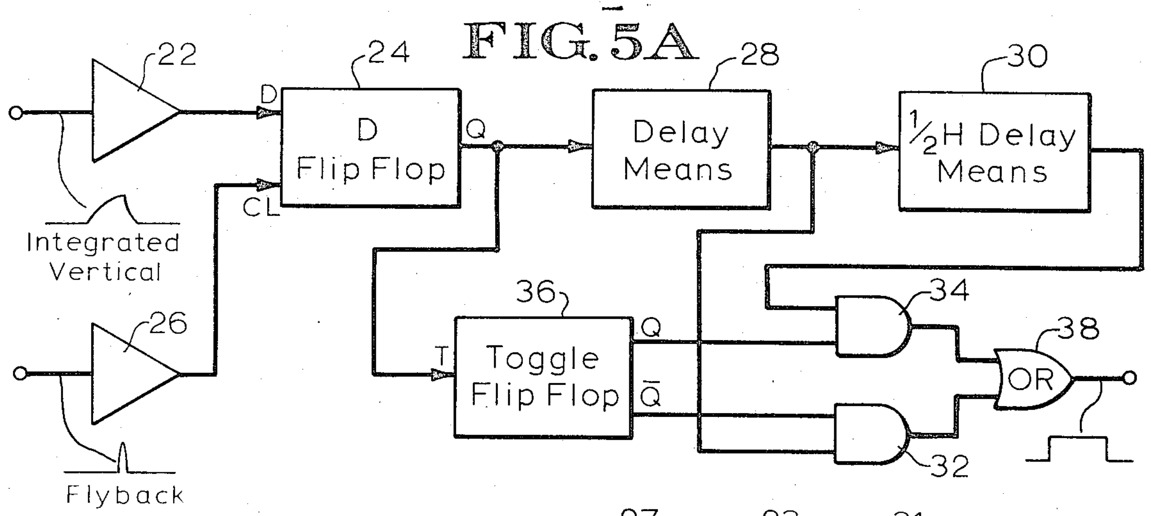
FIG. 5A depicts in block diagram form an anti-pairing circuit constructed in accordance with the principles of this invention.

The principles of this invention may best be understood by a discussion of how the problem of pairing of scan lines occurs in a television receiver. FIG. 1A depicts idealized vertical ramp waveforms which are applied to the vertical deflection coil surrounding the neck of the picture tube of a conventional television receiver. These ramp waveforms are used to control the vertical deflection of the electron beam in synchronism with a received vertical sync pulse. FIG. 1B shows horizontal flyback pulses selected from a typical train of such pulses. These flyback pulses occur during the vertical retrace period and are used to generate the high voltage for the anode of the cathode-ray tube in a manner well known in the art.

According to NTSC standards for color television signals, horizontal sync pulses occur at a rate of 15.734 kHz, while vertical sync pulses occur at a rate of 59.94 Hz (referred to herein as the vertical rate). These frequencies are such that a vertical sync pulse occurs once for every 262 ½ horizontal sync pulses. A television system which receives these horizontal and vertical sync pulses generates horizontal flyback pulses and vertical ramp waveforms of frequencies identical to those of the respective received sync pulses. Thus, one vertical ramp waveform is generated for every 262 ½ horizontal flyback pulses. For purposes of clarity of illustration, FIG. 1B depicts only those horizontal flyback pulses which contribute to the problem of line pairing. Note that a horizontal flyback pulse is shown as overlapping the beginning of vertical ramp waveforms at points A and C. At point B there is no overlap; this is attributable to the fact that horizontal flyback pulses do not occur in integral numbers during a vertical period. If a horizontal flyback pulse does overlap in time the beginning of a vertical ramp waveform for an even-numbered field, this overlap will continue for every even numbered field, but will not occur for all odd-numbered fields. Conversely, if this overlap should occur for odd-numbered fields, it would not occur during even numbered fields. This time relationship between the vertical and horizontal waveforms is pertinent to this invention; the way in which this relationship between the horizontal and vertical waveforms contributes to the problem of pairing will be discussed in detail below.

A simple series circuit, illustrated in FIG. 2A, and the waveforms associated therewith and shown in FIGS. 2B and 2C will be used to point out a phenomenon which contributes to the pairing problem. The circuit consists of a source of square waves V1 in series with its internal impedance 10 and a switch 12. V0 is the voltage appearing across the switch 12. The source V1 generates a square wave whose positive and negative excursions about the zero volts reference line are equal. If switch 12 is closed during the negative excursions of V1, the output voltage at that time will be zero; since the switch is open during the positive excursions of V1, the output voltage is at that time equal to V1. Although the average value of V1 is zero, i.e., the DC component of V1 equals zero, V0 has acquired an average positive DC voltage due to the action of switch 12.

Switch 12 can be thought of in more general terms as a time varying impedance capable of altering a waveform so that it acquires a DC component where there was none initially. It is this phenomenon of a time varying impedance causing a DC shift in a voltage waveform that contributes to the pairing problem.

FIG. 3A shows in simplified form a circuit for developing a vertical ramp waveform. A vertical sync pulse is applied to the base of transistor 14 through a resistance 16. Capacitor 18 is a charging capacitor across which the vertical ramp waveform is developed. A positive bias is provided for the collector of transistor 14 through resistor 20. When a sufficiently large positive vertical sync pulse is applied to resistor 16, transistor 14 will saturate, thereby discharging capacitor 18 to ground through transistor 14. When the vertical sync pulse is removed, transistor 14 reverts to the off condition allowing capacitor 18 to charge toward B+ through resistor 20. Note that the beginning of each ramp coincides with a change of state of transistor 14 from the on to off condition. This procedure is repeated to generate a train of vertical ramp waveforms at the collector of transistor 14.

Recalling the operation of the time-varying impedance described above, transistor 14 can be likened to the switch 12 of FIG. 2A. When transistor 14 is on, it presents a very low impedance to ground through its collector-emitter junctions. Conversely, when transistor 14 is off, its collector terminal presents a much higher impedance to ground at that point. It is precisely this time-varying impedance which appears at the collector of transistor 14 which contributes to the problem of pairing.

Since the amplitude of a horizontal flyback pulse may exceed several hundred volts, the fields generated by this pulse may induce a corresponding pulse in other circuitry. Should such a field induce a horizontal rate pulse into the circuitry connected to the collector terminal of transistor 14 during a time when the transistor is switching from one state to another, the time-varying impedance presented thereby will cause the collector voltage of transistor 14 to experience a DC shift much as in the manner described above for the circuitry of FIG. 2A.

More specifically, if a horizontal flyback pulse overlaps the beginning of a vertical ramp waveform and induces a corresponding pulse into the collector circuitry of FIG. 3A, that portion of the induced pulse which occurs while transistor 14 is on will be mainly shunted to ground through the forward-biased collector-emitter junctions of transistor 14. However, when transistor 14 turns off (corresponding to the beginning of the vertical ramp waveform), the induced pulse appearing at the now reverse-biased collector-base junction of transistor 14 can cause capacitor 18 to become somewhat more charged. This additional charge appearing on capacitor 18 causes the vertical ramp waveform to begin at a voltage level different from that of the previous field when the horizontal flyback pulse did not overlap the beginning of the vertical ramp waveform. Had transistor 14 been either on or off during the entire interval when the induced pulse was present, the impedance at the collector of transistor 14 would have been constant. Capacitor 18 could then have been alternately positively and negatively charged so as to leave no net charge thereon. But when only part of the induced pulse is allowed to charge capacitor 18 (during the off time of transistor 14), a resultant net charge can be expected to remain.

FIGS. 4A and 4B illustrate a train of vertical ramp waveforms and selected horizontal flyback pulses. Note that when the beginning of a ramp waveform is overlapped by a horizontal flyback pulse, a positive DC offset 19 occurs. This is a direct consequence of the net charge which remained on capacitor 18 as a result of an induced pulse occurring during the interval when transistor 14 was switching from on to off as explained above. The positive DC shift induced into every other vertical ramp waveform causes those waveforms to be shifted upward. This means that the vertical ramp waveforms corresponding to field A will begin at one DC level while those corresponding to field B will begin at another level. The effect of this translation in the waveforms of one field with respect to the other is that horizontal scanning lines of one field will not begin at the same vertical height as those of the alternate field, i.e., all horizontal scan lines of one field will be vertically translated a certain amount with respect to the horizontal scan lines of the other field. The effect of this vertical translation of one field relative to the other field is a pairing of the scan lines. It is possible for this DC offset to cause the vertical ramp waveforms of one field to be so offset that the scan lines of the two fields completely overlap (complete pairing).

The amount of the DC offset shown in the vertical ramp waveforms of FIG. 4 has been exaggerated for purposes of explanation. In order to appreciate the sensitivity of the vertical deflection system to pairing, consider the following. Assuming there are 500 active scan lines per frame, for complete pairing one field need only be moved one five hundredth of a field (0.2 percent) with respect to the other. It has been shown experimentally that 10 percent pairing is visible; this amounts to a vertical movement of only 0.02 percent of one field with respect to another. Assuming that the vertical ramp voltage is typically 4 volts peak to peak, a mere 0.8 millivolt offset would cause the 10 percent pairing. These figures show that it is exceedingly difficult to adequately shield the vertical deflection system from undue influence of the horizontal flyback pulses.

This invention takes particular advantage of the fixed phase relationship existing between the horizontal flyback pulses and the vertical ramp waveforms to immunize the vertical deflection system from the effects of pickup from the horizontal flyback pulses. By eliminating the cause of pairing of horizontal scan lines in a manner to be discussed below, proper interlace has been achieved without the use of extensive shielding.

An indispensible precedent to this invention was my discovery of precisely how and why the horizontal flyback pulse causes pairing. As described above, it is the overlap in time of the beginning of the vertical ramp waveform by a horizontal flyback pulse which causes an induced horizontal-rate pulse to be present in the vertical ramp generator circuitry while transistor 14 (FIG. 3A) is changing states from on to off. As a result of this overlap, a DC offset is generated for every other vertical ramp waveform. This invention avoids that problem entirely by changing the phase of the vertical ramp waveforms so that no horizontal flyback pulse occurs during the interval when transistor 14 is changing states from on to off. This is accomplished be rephasing the vertical ramp waveforms by an amount sufficient to avoid overlap between a horizontal flyback pulse and the beginning of a vertical ramp waveform. The vertical ramp waveforms are preferably rephased with respect to the horizontal flyback pulses by ¼ of a horizontal line period. This achieves the maximum separation in time between horizontal flyback pulses and the beginnings of the vertical ramp waveforms of both fields. It therefore also provides the greatest degree of tolerance in the rephasing. However, if tolerances in this rephasing operation are no problem, the vertical ramp waveforms could be rephased over a range of from about 1/10 to approximately 4/10 of a horizontal line period, depending on the width of the horizontal flyback pulses and the amount of ringing following each pulse.

Since the beginning of a vertical ramp waveform coincides with the change in state of transistor 14 from on to off (and this is the change in state which must not be overlapped by a horizontal flyback pulse), it is understood that any reference herein to the beginning of a vertical ramp waveform also necessarily refers to a change in state of transistor 14 from on to off.

Note that even though the vertical ramp waveform is being rephased to avoid pairing, components of a horizontal flyback pulse might yet be induced into the vertical deflection system; however, the result would be an AC pickup rather than a DC shift in the vertical ramp waveform. FIGS. 4A and 4B also illustrate the effects of this AC pickup as periodic disturbances 21 in the ramp waveforms; again, the effects on the vertical ramp waveforms have been exaggerated for purposes of clarity. (Note that the flyback pulses resulting in offsets 19 are not being discussed here.) This AC pickup would effect only individual horizontal scan lines rather than shifting one entire field relative to another as the DC offset did. In addition, since the horizontal flyback pulses occur only during retrace time when the electron beam is being rapidly returned to the left side of the raster after completion of a horizontal scan, the effects of this AC pickup will not be seen by a viewer.

Figures 5B, 5C, 5D:
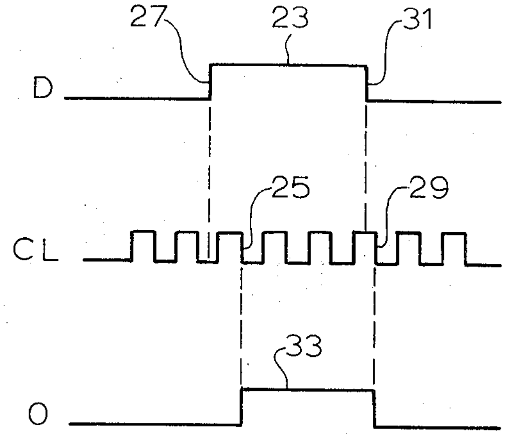
FIGS. 5B–5D schematically depict selected waveforms associated with the circuitry of FIG. 5A.

FIG. 5A illustrates a preferred embodiment of an anti-pairing circuit according to this invention which alters the phase of the vertical ramp waveform so that no horizontal flyback pulse overlaps the beginning of a vertical ramp waveform. An integrated vertical sync pulse which may be derived from a conventional sync separator system (not shown) is applied to the input of a saturating amplifier 22. The output of amplifier 22 is a rectangular vertical-rate (59.94 Hz) pulse 23 (FIG. 5B) which is coupled to the D input of a D- flip flop 24 which may be of conventional construction. A horizontal flyback pulse, available from a conventional flyback transformer (not shown), is applied to the input of a saturating amplifier 26 which develops a rectangular flyback pulse (FIG. 5C) for application to the clock input CL of D- flip flop 24, developing a vertical-rate output pulse 33 (FIG. 5D) at terminal Q which is synchronized with the rectangular flyback pulses as shown in FIGS. 5C and 5D. This synchronization of the vertical-rate output pulse 33 with the flyback input is achieved by causing flip flop 24 to be triggered by the trailing edge 25 of the first flyback pulse which occurs after the leading edge 27 of a vertical-rate pulse has appeared at input D; flip flop 24 is then reset by the trailing edge 29 of the first horizontal flyback pulse which occurs following the trailing edge 31 of the input pulse 23 at terminal D.

The synchronized vertical-rate output pulses 33 appearing at the output of flip flop 24 are coupled to a delay means 28 which delays these pulses by an amount sufficient to insure that a horizontal flyback pulse does not overlap the beginning of a vertical ramp waveform. These delayed vertical-rate pulses are now applied to delay means 30 for adding an additional ½ horizontal line delay. This additional delay is necessary to insure that the vertical-rate pulses appearing at the output of delay means 28 and delay means 30 are separated in time by precisely ½ a horizontal line.

These vertical-rate pulses are then applied to AND gates 32 and 34 respectively. Both AND gates are activated alternately by the action of a toggle flip flop 36 which is itself triggered by the vertical-rate pulses 33 at terminal Q of flip flop 24. AND gates 32, 34 drive OR gate 38 whose output consists of vertical-rate pulses which are alternately delayed by ½ a horizontal line. These pulses are then used to drive a vertical ramp generator as shown in FIG. 3A. This ½ horizontal line delay existing between alternate vertical pulses is necessary to restore that relationship which was lost by the action of flip flop 24 so that alternate fields of the television raster will be properly positioned.

An alternate embodiment to that of FIG. 5A could have flip flop 24 driving two delay means 28 in parallel, the first of which is followed by a ½ H delay means 30 for introducing an additional ½ a horizontal line period delay. The output could then be taken alternately from the ½ H delay means 30 and the second delay means 28.

Figure 6A:
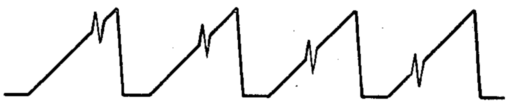
FIGS. 6A–6B depict trains of television vertical ramp waveforms and selected horizontal flyback pulses useful in understanding this invention.
Figure 6B:

FIG. 6A shows a train of vertical ramp waveforms whose phase has been altered by the anti-pairing circuit of FIG. 5A. The selected horizontal flyback pulses which are shown in FIG. 6B indicate the new phase relationship between the two pulse trains. Note that there is now no overlap between a horizontal flyback pulse and the beginning of a vertical ramp waveform. The influence of the horizontal flyback pulses on the vertical ramp waveforms has been shown in exaggerated form in order to point out that, although the field generated by the horizontal flyback pulses still induces a voltage into the horizontal deflection system, it no longer causes the vertical ramp waveforms to experience a DC shift. The voltages induced into the vertical deflection system are of an AC nature and influence the vertical ramp waveform only for the duration of the horizontal flyback pulse. As discussed above, the horizontal flyback pulse occurs during the horizontal retrace interval; this effect on the vertical ramp waveform is never seen by a viewer.

Figure 7A:
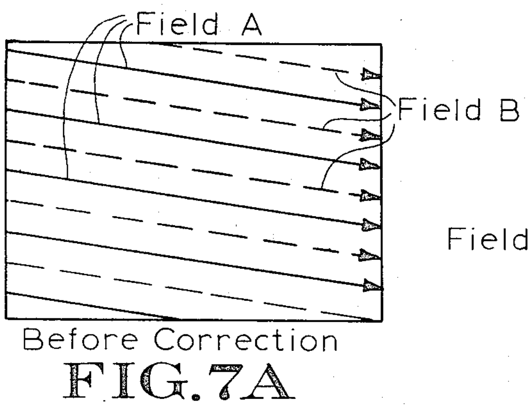
FIG. 7 illustrates the manner in which a television raster is scanned by an electron beam before and after correction by the anti-pairing circuit of FIG. 5A.
Figure 7B:
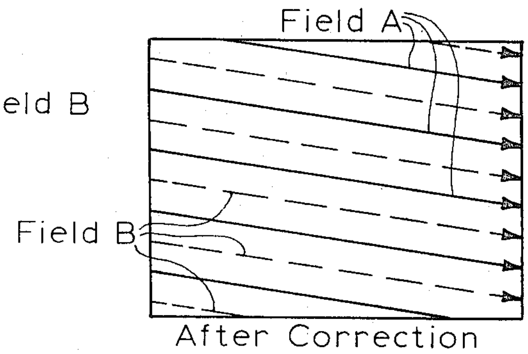

FIGS. 7A and 7B indicate how fields A and B would be scanned on a television raster before and after correction by the anti-pairing method and circuit of this invention, assuming delay means 28 of FIG. 5 delays each vertical-rate pulse 33 by the preferred ¼ of a horizontal line period. It can be seen in FIGS. 7A and 7B, illustrating the teachings of this invention that both field A and field B have been shifted to the right by ¼ of a horizontal line. Note that in both cases, the scan of field B is begun ½ a horizontal line to the right of field A. As described above, it is this ½ horizontal line delay which is necessary for the perfect interlace of both fields.

Thus, it is apparent that there has been provided, in accordance with the invention, an improved vertical deflection system that fully satisfies the objects as set forth above. While the invention has been described in conjunction with specific embodiments thereof, it is evident that many alternatives, modifications and variations will be apparent to those skilled in the art in the light of the foregoing invention. For example, providing delay means 28 of FIG. 5A with a delay of ¾ of a horizontal line period or an odd multiple thereof, rather than ¼ of a horizontal line as suggested, will achieve substantially the same results. Likewise, the range over which delay means 28 may operate need not be necessarily restricted to less than ½ a horizontal line period. The allowable range can be generally expressed as a multiple of ½ the horizontal line period plus from 10–40 percent of the horizontal line period. As the number of multiples of ½ of the horizontal line periods is increased, the point at which the initial trace of each field is begun is moved progressively lower on the television raster. Accordingly, it is intended to embrace all such alternatives, modifications and variations which fall within the spirit and scope of the appended claims.

I claim:

1. A method for improving interlace between the horizontal scan lines of the two alternate raster fields of a television receiver in which vertical and horizontal deflection systems control the scan of an electron beam on a cathode-ray tube and in which a horizontal flyback pulse is generated during the horizontal retrace period, comprising:

generating a train of vertical ramp waveforms to be applied to the vertical deflection system of the television receiver for causing the electron beam to be vertically deflected in synchronism with a received television signal; and delaying the start of the vertical ramp waveforms with respect to the horizontal flyback pulses by a predetermined interval effective to insure that the beginnings of the vertical ramp waveforms for either field are not overlapped by a horizontal flyback pulse, whereby any components of the horizontal flyback pulse which are induced into a vertical ramp waveform occur at a time when their inclusion does not cause the lines of one field to pair with the lines of the alternate field.

2. A method for improving interlace between the horizontal scan lines of alternate raster fields of a television receiver in which vertical and horizontal deflection systems control the scan of an electron beam on a cathode-ray tube and in which a horizontal flyback pulse is generated during the horizontal retrace period, comprising:

- generating an initial train of vertical-rate pulses, each of which has a duration equal to an integral number of horizontal periods and is separated in time from every other vertical-rate pulse by an integral number of horizontal periods;
- generating a first delayed pulse train by delaying the start of each vertical-rate pulse of the initial train a predetermined delay interval;
- delaying said first delayed pulse train by one-half a horizontal line to form a second delayed pulse train, said predetermined delay interval being chosen to insure that the trailing edge of each pulse in said first and second delayed pulse trains is not overlapped by any horizontal flyback pulse; and
- alternately choosing a pulse from said first and second delayed pulse trains for application to the vertical deflection system.

3. A method as defined in claim 2 wherein the predetermined delay interval associated with said first delayed pulse train is approximately equal to one-quarter of a horizontal line period and each vertical-rate pulse within said initial pulse train exhibits a fixed predetermined phase relationship to the horizontal flyback pulses which insures that the trailing edge of each pulse in said first and second delayed pulse train is not overlapped by any horizontal flyback pulse.

4. A method as defined in claim 2 wherein the predetermined delay interval associated with said first delayed pulse train is substantially within the range of one-tenth to four-tenths of a horizontal line period.

5. A method as defined in claim 2 wherein the predetermined delay interval associated with said first delayed pulse train is a multiple of ½ of the horizontal line period plus between 10 and 40 percent of a horizontal line.

6. An anti-pairing system for improving interlace between the horizontal scan lines of alternate raster fields of a television receiver in which vertical and horizontal deflection systems control the scan of an electron beam on a cathode-ray tube and in which a horizontal flyback pulse is generated during the horizontal retrace period, comprising:

- means for generating a train of vertical ramp waveforms to be applied to the vertical deflection system of the television receiver for causing the electron beam to be vertically deflected in synchronism with a received television signal; and
- means for displacing the start of the vertical ramp waveforms with respect to the horizontal flyback pulses by a predetermined interval effective to insure that the beginnings of the vertical ramp waveforms for either field are not overlapped by a horizontal flyback pulse, whereby any components of the horizontal flyback pulse which are induced into a vertical ramp waveform occur at a time when their inclusion does not cause the lines of one field to pair with the line of the alternate field.

7. An anti-pairing system for improving interlace between the horizontal scan lines of alternate raster fields of a television receiver in which vertical and horizontal deflection systems control the scan of an electron beam on a cathode-ray tube and in which a horizontal flyback pulse is generated during the horizontal retrace period, comprising:

- means for generating an initial train of vertical-rate pulses, each of which has a duration equal to an integral number of horizontal periods and is separated in time from every other vertical-rate pulse by an integral number of horizontal periods;
- means for delaying the start of each vertical-rate pulse of the initial train a predetermined delay interval to form a first delayed pulse train;
- means for delaying said first delayed pulse train by ½ a horizontal line to form a second delayed pulse train, said predetermined delay interval being chosen to insure that the trailing edge of each pulse in said first and second delayed pulse trains is not overlapped by any horizontal flyback pulse; and
- means for alternately choosing a pulse from said first and second delayed pulse trains for application to the vertical deflection system.

8. A system as defined in claim 7 wherein the predetermined delay interval associated with said first delayed pulse train is approximately equal to one-quarter of a horizontal line period and each vertical-rate pulse within said initial pulse train exhibits a fixed predetermined phase relationship to the horizontal flyback pulses which insures that the trailing edge of each pulse in said first and second delayed pulse train is not overlapped by any horizontal flyback pulse.

9. A system as defined in claim 7 wherein the predetermined delay interval associated with said first delayed pulse train is within the range of 1/10 to 4/10 of a horizontal line period.

10. A method as defined in claim 7 wherein the predetermined delay interval associated with said first delayed pulse train is a multiple of ½ of the horizontal line period plus between 10 and 40 percent of a horizontal line.

11. In a television receiver having a vertical deflection system for controlling the vertical scan of an electron beam on a cathode-ray tube in synchronism with a received vertical sync pulse, and in which a horizontal flyback pulse is generated during a horizontal retrace period, the combination comprising:

- a pulse generator including a D-type flip flop whose D input consists of integrated vertical sync pulses, whose clock input consists of horizontal flyback pulses, and whose output is a train of vertical-rate pulses synchronized to the flyback pulses;
- first delay means coupled to the output of said pulse generator for delaying each vertical-rate pulse by a predetermined delay interval;
- second delay means coupled to the output of said first delay means for delaying each vertical-pulse an additional ½ horizontal line period; and
- selector means receiving the vertical-rate pulses appearing at the outputs of said first and second delay means and responsive to the pulse generator output for alternately selecting the vertical-rate pulses from said first and second delay means for application to said vertical deflection system, said predetermined delay interval being chosen to insure that the trailing edges of all vertical-rate pulses appearing at the outputs of said first and second delay means are not overlapped by any horizontal flyback pulses so that any components of a horizontal flyback pulse which are induced into the vertical deflection system occur at a time when their inclusion does not cause the lines of one field to pair with the lines of the alternate field.

12. The combination defined by claim 11 wherein said predetermined delay interval is approximately ¼ of a horizontal line period.

13. The combination defined by claim 11 wherein said predetermined delay interval is within the range of 1/10 to 4/10 of a horizontal line period.

14. The combination defined by claim 11 wherein said predetermined delay interval is a multiple of ½ of the horizontal line period plus between 10 and 40 percent of a horizontal line.

15. An anti-pairing system for improving interlace between the horizontal scan lines of alternate raster fields of a television receiver in which vertical and horizontal deflection systems control the scan of an electron beam on a cathode-ray tube and in which a horizontal flyback pulse is generated during the horizontal retrace period, comprising:

means for generating a train of vertical ramp waveforms to be applied to the vertical deflection system of the television receiver for causing the electron beam to be vertically deflected in synchronism with a received television signal; and means for displacing the vertical ramp waveforms in time with respect to the horizontal flyback pulses by a predetermined delay interval equal to a multiple of ½ of the horizontal line period plus between 10 and 40 percent of a horizontal line.

* * * * *